(12) United States Patent
Yamazaki et al.

(10) Patent No.: US 8,116,182 B2
(45) Date of Patent: Feb. 14, 2012

(54) INFORMATION PROCESSING APPARATUS AND FAULT SYMPTOM DETERMINATION METHOD

(75) Inventors: Hiroshi Yamazaki, Ome (JP); Toru Hanada, Ome (JP); Tooru Mamata, Akiruno (JP); Makoto Ando, Hanno (JP); Yoshihiro Kaneko, Fussa (JP); Hiroshi Ohno, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 47 days.

(21) Appl. No.: 12/628,091

(22) Filed: Nov. 30, 2009

(65) Prior Publication Data

US 2010/0246351 A1   Sep. 30, 2010

(30) Foreign Application Priority Data

Mar. 24, 2009   (JP) .................. 2009-072482

(51) Int. Cl.
G11B 27/36   (2006.01)
(52) U.S. Cl. ................. 369/53.1; 369/53.42; 369/53.43; 369/47.44
(58) Field of Classification Search ............... 369/47.36, 369/47.44, 30.16, 47.53, 53.17, 53.42, 53.43; 720/601
See application file for complete search history.

(56) References Cited

U.S. PATENT DOCUMENTS

| | | | | |
|---|---|---|---|---|
| 7,149,168 | B2 * | 12/2006 | Kamon ....................... | 369/47.53 |
| 7,177,238 | B2 * | 2/2007 | Huang ........................ | 369/30.16 |
| 2005/0152246 | A1 * | 7/2005 | Li et al. ..................... | 369/47.44 |
| 2006/0132958 | A1 | 6/2006 | Kouno et al. | |
| 2008/0235715 | A1 * | 9/2008 | Washiya et al. ............... | 720/601 |
| 2008/0247287 | A1 * | 10/2008 | Van Someren ............. | 369/53.17 |
| 2008/0253246 | A1 * | 10/2008 | Huang et al. ................ | 369/47.36 |
| 2009/0059757 | A1 * | 3/2009 | Haustein et al. ........... | 369/53.42 |

FOREIGN PATENT DOCUMENTS

| | | |
|---|---|---|
| JP | 07-272471 | 10/1995 |
| JP | 09-282603 | 10/1997 |
| JP | 10-64001 | 3/1998 |
| JP | 10-188451 | 7/1998 |
| JP | 2006-172636 | 6/2006 |
| JP | 2007-294000 | 11/2007 |
| JP | 2008-108339 | 5/2008 |

OTHER PUBLICATIONS

Japanese Office Action for Japanese Application No. 2009-072482, dated Jun. 8, 2010, in 4 pages.

* cited by examiner

*Primary Examiner* — Thuy Pardo
(74) *Attorney, Agent, or Firm* — Knobbe, Martens, Olson & Bear, LLP

(57) ABSTRACT

According to one embodiment, an information processing apparatus includes an optical disc drive, a measuring module in the optical disc drive, and a measurement value reception module. The measuring module is configured to measure a value related to an operation of a predetermined motor in the optical disc drive, which is executed during a time period of power-up of the optical disc drive. The measurement value reception module is configured to receive a measurement value related to the operation of the predetermined motor from the optical disc drive in response to an event of being requested to turn off the power of the optical disc drive, and to store the received measurement value in a storage device.

12 Claims, 11 Drawing Sheets

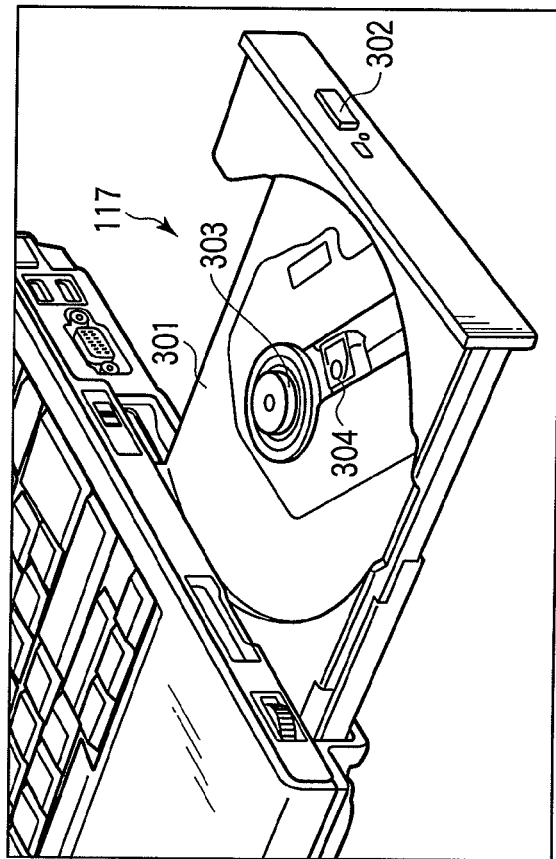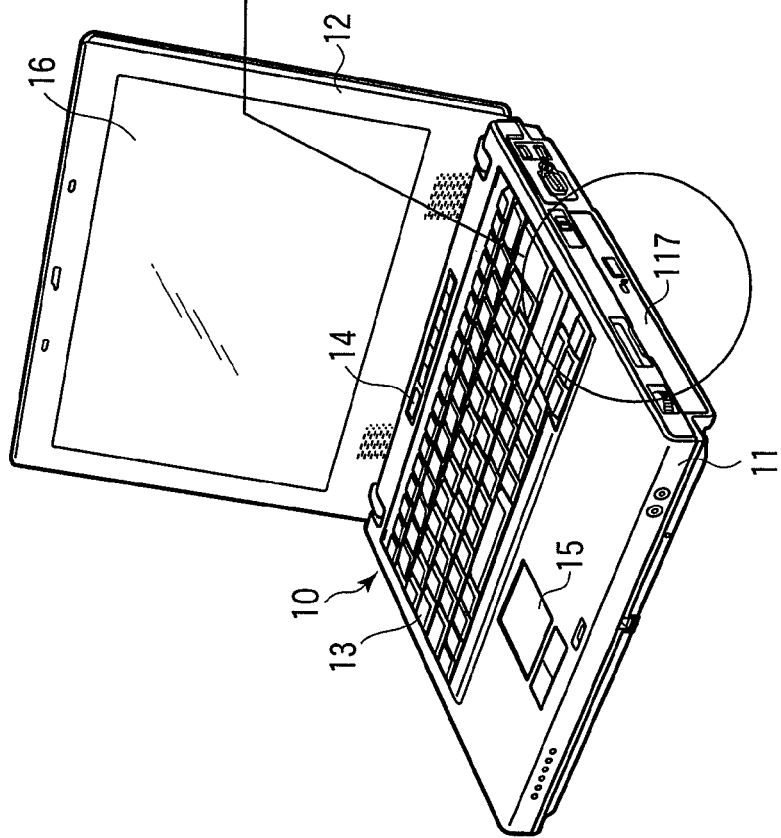
FIG. 1

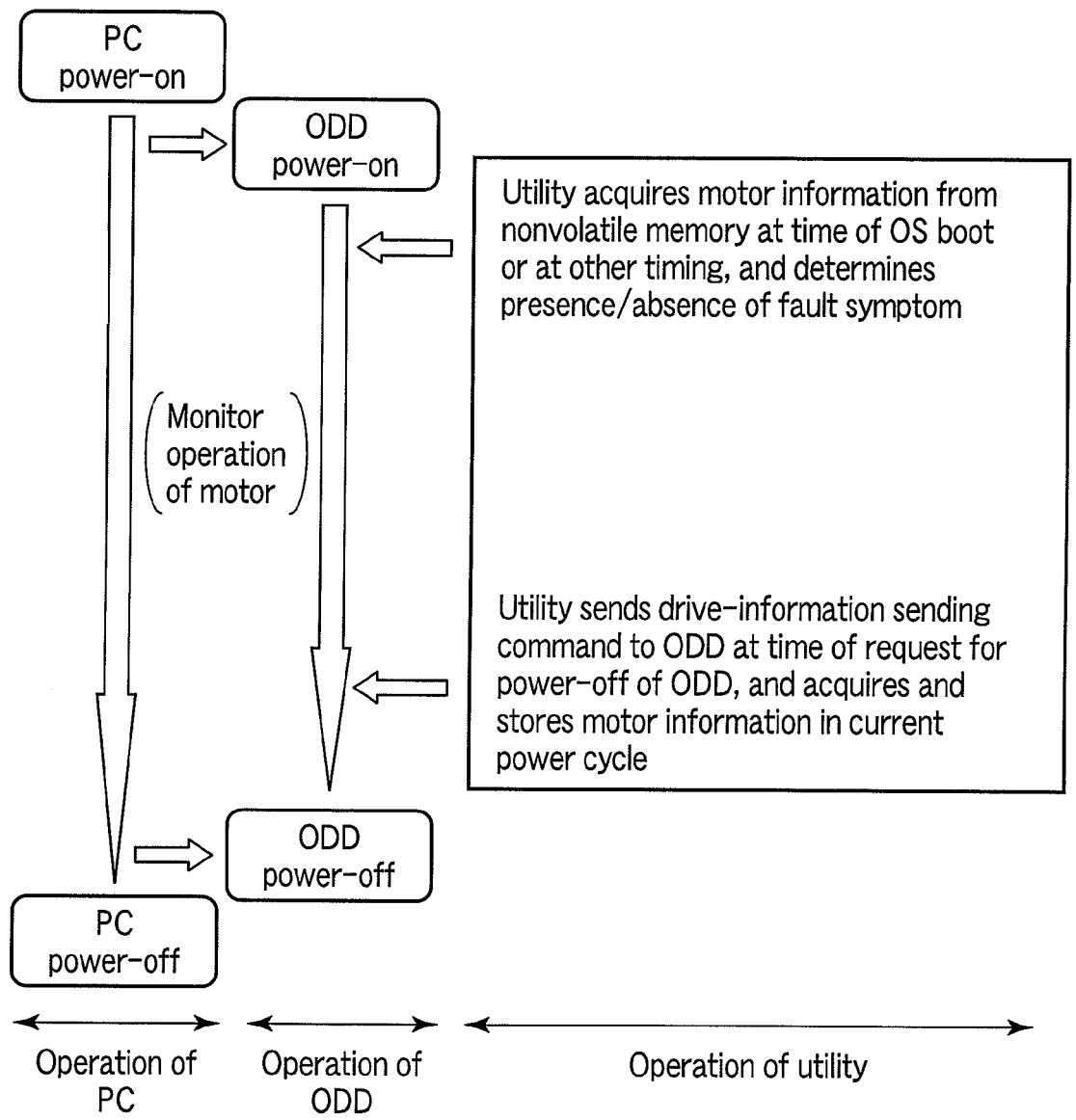
F I G. 4

| | Fault symptom by smart information of HDD | Fault symptom of ODD |
|---|---|---|
| Accumulation of value | Accumulation from time of first use of HDD | Accumulation in every power cycle of ODD |
| Storage location of value | Inside of HDD | Nonvolatile storage device in PC |
| Acquisition of value | Smart command | Drive-information sending command |
| Utility management | Determine presence/absence of fault symptom on the basis of acquired value | · Acquire value in current power cycle from ODD before power-off of ODD, and store the value<br>· Totalize values corresponding to plural power cycles, and determine presence/absence of fault symptom on the basis of the totalization result |

F I G. 6

| Test items | Fault symptom detection method in ODD |
|---|---|
| Total seek count of thread motor | Acquire from ODD total seek count from ODD power-on to ODD power-off, and store the total seek count in nonvolatile storage device |
| Total seek distance of thread motor | acquire from ODD total seek distance from ODD power-on to ODD power-off, and store the total seek distance in nonvolatile storage device |
| 12 cm media determination time of spindle motor | Acquire 12 cm media discrimination time from ODD, and store the 12 cm media discrimination time in nonvolatile storage device |
| Average seek time of thread motor | Acquire seek time between specified cylinders from ODD, and store the seek time in nonvolatile storage device as average seek time |
| ⋮ | ⋮ |

FIG. 7

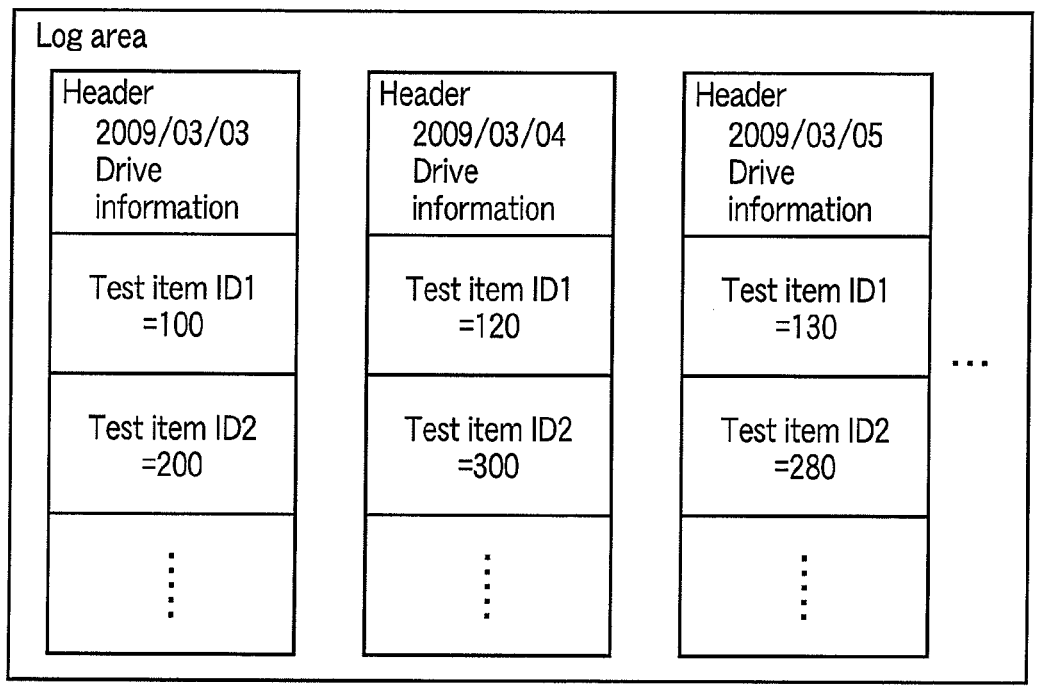
F I G. 10
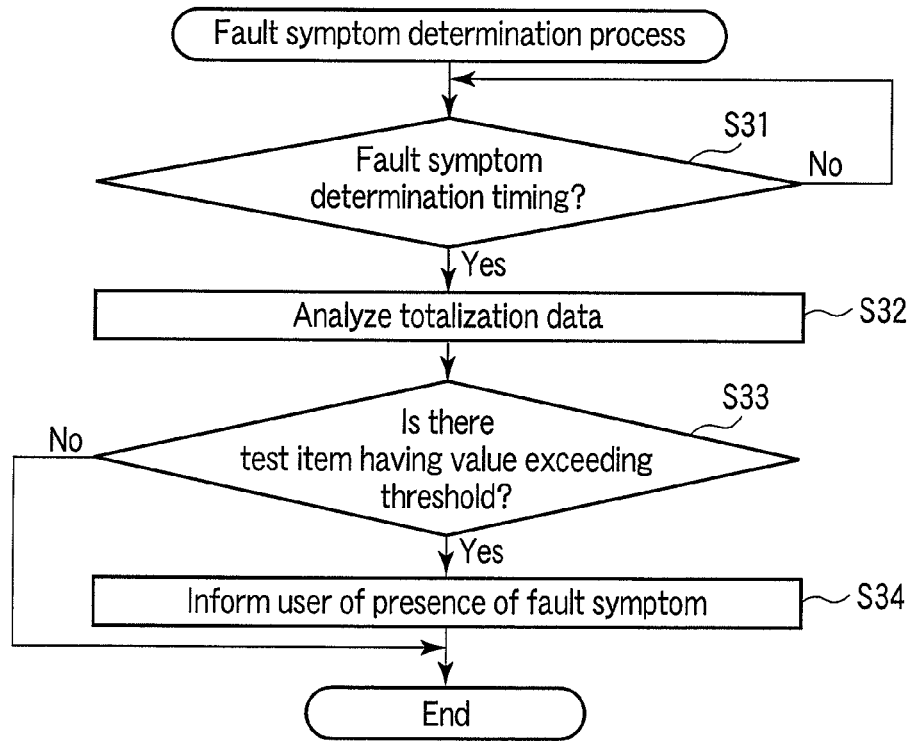
F I G. 11

INFORMATION PROCESSING APPARATUS AND FAULT SYMPTOM DETERMINATION METHOD

CROSS-REFERENCE TO RELATED APPLICATIONS

This application is based upon and claims the benefit of priority from Japanese Patent Application No. 2009-072482, filed Mar. 24, 2009, the entire contents of which are incorporated herein by reference.

BACKGROUND

1. Field

One embodiment of the invention relates to an information processing apparatus and a fault symptom determination method which is applied to this apparatus.

2. Description of the Related Art

In general, in an information processing apparatus such as a personal computer, a hard disk drive is used as a storage device. The hard disk drive is a magnetic disk apparatus in which data is stored on a disk storage medium which is called a hard disk.

In usual cases, the hard disk drive (HDD) has a function called S.M.A.R.T. (Self-Monitoring Analysis And Reporting Technology). Values (S.M.A.R.T. information), which correspond to various test items of the HDD and are obtained by this function, are stored in the disk storage medium. The S.M.A.R.T. information can be used for predicting a fault of the HDD.

Jpn. Pat. Appln. KOKAI Publication No. 9-282603 discloses a magnetic disk apparatus having a function of predicting the occurrence of a fault. In this magnetic disk apparatus, various events, which are objects of monitoring and may relate to a fault of the magnetic disk apparatus, are monitored. When a certain event that is to be monitored has occurred, the monitor value corresponding to this to-be-monitored event is incremented. The incremented monitor value is stored in a system area on the disk storage medium.

In the meantime, most of information processing apparatuses, such as personal computers, include not only the HDD, but also an optical disc drive (ODD). The ODD is a drive which drives optical disc media which are removable media. The optical disc media are used not only as storage media for installing various software (e.g., an operating system, an application program) in a personal computer, but also as storage media for backing up data. Thus, in case a fault has occurred in the ODD, the function of the personal computer is considerably restricted as in the case of a fault occurring in the HDD.

However, the ODD includes neither storage media, which can permanently store data, in the drive thereof, nor a self-test function such as a S.M.A.R.T. function. Thus, under the present circumstances, a fault of the ODD is not practically predicted.

In order to enhance the reliability of the personal computer, it is necessary, therefore, to realize a new scheme for obtaining information that is necessary for predicting a fault in the ODD.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary perspective view showing the external appearance of an information processing apparatus according to an embodiment of the invention;

FIG. 4 is an exemplary view for explaining an example of a fault symptom determination process which is executed by the information processing apparatus according to the embodiment;

FIG. 6 is an exemplary view for explaining the function of the fault symptom determination process which is executed by the information processing apparatus according to the embodiment;

FIG. 7 is an exemplary view for explaining examples of test items which are acquired by the fault symptom determination process which is executed by the information processing apparatus according to the embodiment;

FIG. 10 shows an example of the data structure of log data which is generated by the data totalization process illustrated in FIG. 9;

FIG. 11 is an exemplary flow chart illustrating an example of the procedure of a determination process which is executed by the information processing apparatus according to the embodiment.

DETAILED DESCRIPTION

Figure 2:
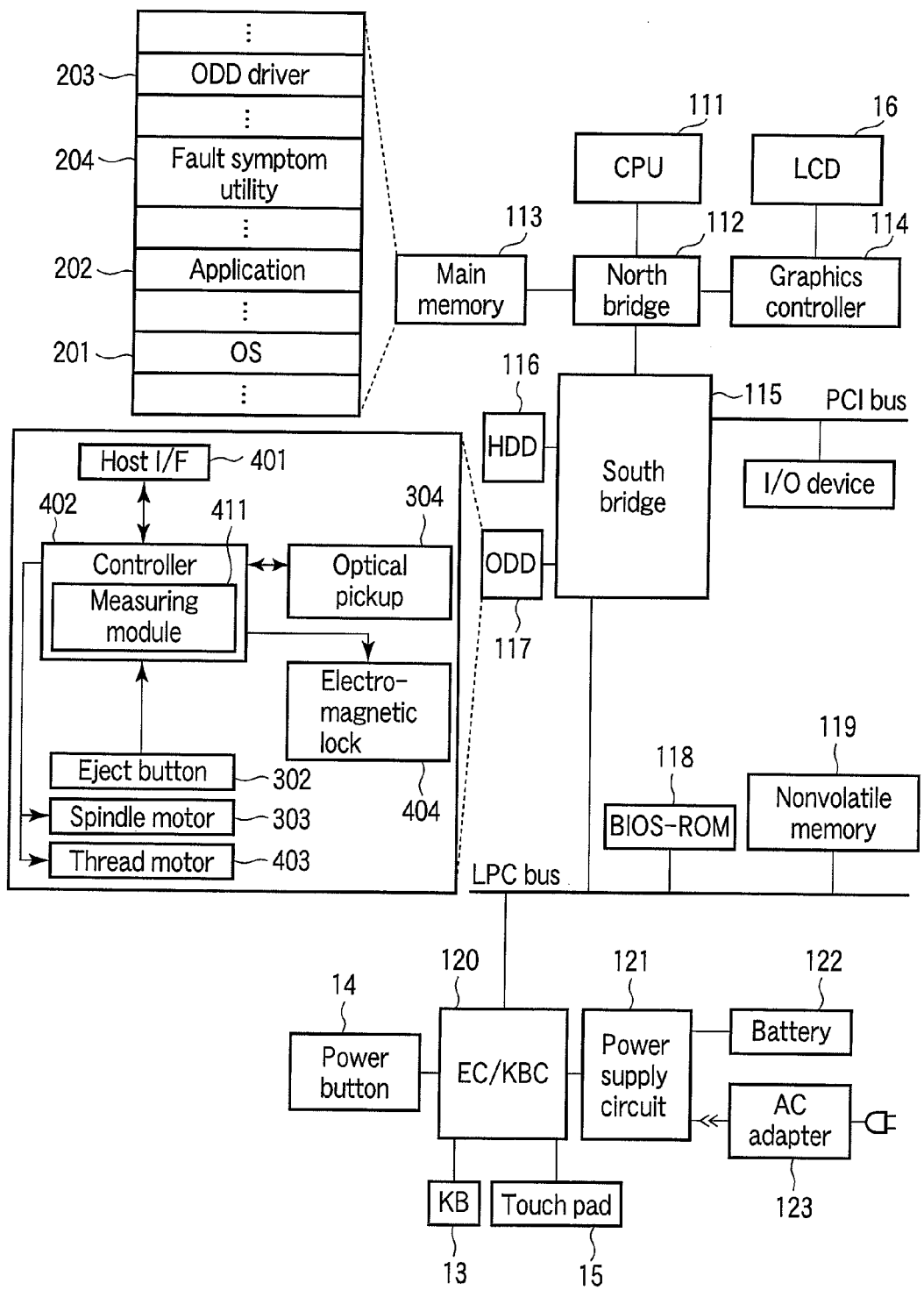
FIG. 2 is an exemplary block diagram showing the system configuration of the information processing apparatus according to the embodiment.

Various embodiments according to the invention will be described hereinafter with reference to the accompanying drawings. In general, according to one embodiment of the invention, there is provided an information processing apparatus comprising: an optical disc drive; a measuring module in the optical disc drive, and configured to measure a value related to an operation of a predetermined motor in the optical disc drive, which is executed during a time period of power-up of the optical disc drive; and a measurement value reception module configured to receive from the optical disc drive a measurement value related to the operation of the predetermined motor from the optical disc drive in response to an event of being requested to turn off the power of the optical disc drive, and to store the received measurement value in a storage device.

To begin with, referring to FIG. 1, the structure of an information processing apparatus according to the embodiment of the invention is described. The information processing apparatus is realized, for example, as a battery-powerable portable notebook personal computer 10.

FIG. 1 is a perspective view showing the computer 10, as viewed from the front side, in the state in which a display unit thereof is opened. The computer 10 comprises a computer main body 11 and a display unit 12. A display device that is composed of an LCD (Liquid Crystal Display) 16 is built in the display unit 12.

The display unit 12 is supported and attached to the computer main body 11 such that the display unit 12 is freely rotatable between an open position where a top surface of the computer main body 11 is exposed and a closed position where the top surface of the computer main body 11 is covered by the display unit 12. The computer main body 11 has a thin box-shaped casing. A keyboard 13, a power button 14 for powering on/off the computer 10, and a touch pad 15 are disposed on the top surface of the computer main body 11.

In addition, an optical disc drive 117 for driving optical disc media is provided in the computer main body 11. The optical disc drive 117 includes, for example, a tray 301 on which an optical disc medium is removably mounted, an eject button 302, a spindle motor 303, and an optical pickup head 304.

The tray 301 is attached to the housing of the optical disc drive 117 such that the tray 301 may move between an inserted position where the tray 301 is loaded in the main body 11 and a projected position where the tray 301 is projected to the outside from the main body 11. When the eject button 302, which is provided on the outer wall of the tray 301, is operated by the user in the state in which the tray 301 is loaded in the main body 11, the tray 301 is ejected to the outside from the main body 11 and is moved to the projected position.

The spindle motor 303 is a motor for rotating the optical disc medium that is loaded in the optical disc drive 117. The optical pickup head 304 radiates a light beam (laser beam) on the optical disc medium, and outputs a detection signal corresponding to reflective light from the optical disc medium. The optical pickup head 304 is moved in the radial direction of the optical disc medium by a thread mechanism (optical pickup head moving mechanism) which is provided in the tray 301.

FIG. 2 shows the system configuration of the computer 10.

The computer 10 comprises a CPU 111, a north bridge 112, a main memory 113, a graphics controller 114, a south bridge 115, a hard disk drive (HDD) 116, an optical disc drive (ODD) 117, a BIOS-ROM 118, a nonvolatile memory 119, an embedded controller/keyboard controller (EC/KBC) IC 120, and a power supply circuit 121.

The CPU 111 is a processor which controls the operation of the components of the computer 10. The CPU 111 executes various software which is loaded from the HDD 116 into the main memory 113, such as an operating system (OS) 201, an application program 202, an ODD driver program 203, and a fault symptom utility program 204.

The fault symptom utility program 204 is a program for predicting a fault of the ODD 117. In the present embodiment, the ODD 117 is provided with a function of measuring motor information, i.e., values relating to the operation of a motor (ODD motor) in the ODD 117. The fault symptom utility program 204 sends, for example, a predetermined command (drive-information sending command) to the ODD 117 via the ODD driver program 203, thereby being able to acquire motor information from the ODD 117. The motor information, which is acquired from the ODD 117, is stored, for example, in the nonvolatile memory 119.

The CPU 111 also executes a BIOS (Basic Input/Output System) which is stored in the flash BIOS-ROM 118. The BIOS is a program for hardware control.

The north bridge 112 is a bridge device which connects a local bus of the CPU 111 and the south bridge 115. The north bridge 112 has a function of executing communication with the graphics controller 114. Further, the north bridge 112 includes a memory controller which controls the main memory 113.

The graphics controller 114 is a display controller for controlling the LCD 16 that is used as a display monitor of the computer 10. The south bridge 115 is connected to a PCI (Peripheral Component Interconnect) bus and an LPC (Low Pin Count) bus.

Each of the HDD 116 and ODD 117 is connected to the south bridge 115 via a serial ATA bus or the like. The ODD 117 includes, in the addition to the above-described eject button 302, spindle motor 303 and optical pickup head 304, a host interface 401, a controller 402, a thread motor 403, and an electromagnetic lock mechanism 404. The host interface 401 executes communication with an ATA controller in the south bridge 115. The controller 402 controls the operation of the ODD 117.

The thread motor 403 is a motor for driving the thread mechanism and moving the optical pickup head 304 in the radial direction of optical disc media. The thread motor 403 is composed of, for instance, a stepping motor. An operation of moving the optical pickup head 304 in the radial direction of optical disc media is called a "seek operation".

The controller 402 includes a measuring module 411. The measuring module 411 measures values relating to the operation of the ODD motor which is executed during a 1 power cycle from power-on to power-off of the ODD 117 (e.g. a total operation time of the spindle motor 303, a total number of times of turn-on of the spindle motor 303, a media determination time, a total number of times of seek of the thread motor 403, a total seek distance of the thread motor 403, and an average seek time of the thread motor 403). A plurality of items of measurement (test items) are preset with respect to each of the spindle motor 303 and thread motor 403. The measuring module 411 can be realized as hardware or firmware.

The embedded controller/keyboard controller IC (EC/KBC) 120 is a 1-chip microcomputer in which an embedded controller for power management and a keyboard controller for controlling the keyboard (KB) 13 and touch pad 15 are integrated. The EC/KBC 120 cooperates with the power supply circuit 121 to power on/off the computer 10 in response to the user's operation of the power button switch 14. The power supply circuit 121 uses power from a battery 122 which is built in the computer main body 11 or external power which is supplied via an AC adapter 123, thereby generating system power that is to be supplied to the respective components of the computer 10.

Figure 3:
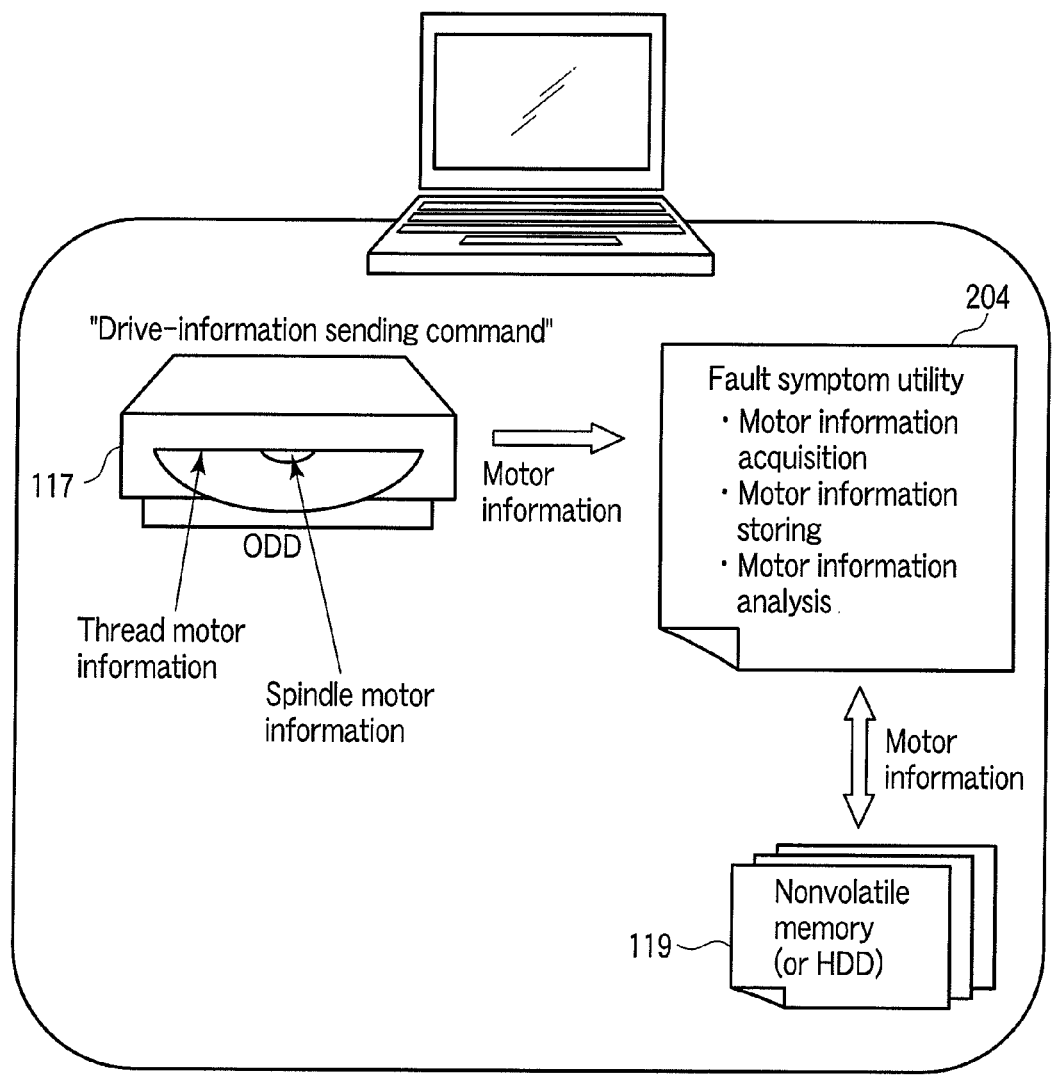
FIG. 3 is an exemplary block diagram illustrating a fault symptom determination operation which is executed by the information processing apparatus according to the embodiment.

FIG. 3 is a block diagram showing an example of the structure of a fault symptom determination system which is used in the present embodiment.

The ODD 117 is provided with the function of measuring, as motor information, various values which are indicative of the operation of the ODD motor which is executed during a power cycle from power-on to power-off of the ODD 117 (e.g. the number of times of motor turn-on, and the time of motor operation). This measuring function is executed by the above-described measuring module 411. In addition, the ODD 117 is provided with a command response function which sends to the computer main body 11, which is a host, the motor information including various measurement values, such as the measured number of times of motor turn-on and the measured time of motor operation, in response to the reception of the above-described drive-information sending command. This command response function is executed by the controller 402 or measuring module 411 in the ODD 117.

When there occurs an event of requesting power-off of the ODD 117, the fault symptom utility program 204 sends the drive-information sending command to the ODD 117, thereby acquiring the motor information from the ODD 117 and storing the acquired motor information in the nonvolatile storage device (nonvolatile memory 119 or HDD 116) in the computer 10. When the motor information is stored, a process of updating the values of the motor information, which is already stored in the nonvolatile storage device, may be executed on the basis of the acquired motor information. The fault symptom utility program 204 analyzes the motor information, which is already stored in the nonvolatile storage device, for example, at predetermined time intervals or at a timing designated by user, and determines the presence/absence of a fault symptom of the ODD 117 on the basis of the analysis result. For example, if the value of a certain test item relating to the motor operation has exceeded a threshold value, the fault symptom utility program 204 executes a process of informing the user of the presence of a fault symptom in the ODD 117. The threshold value may be set with respect to each of the test items.

Next, referring to FIG. 4, an example of the fault symptom determination operation is described.

When the computer (PC) 10 is powered on, the ODD 117 is also powered on in accordance with the power-on of the computer (PC) 10. In a power-off sequence for shutting down the computer (PC) 10, a process of powering off the ODD 117 is also executed.

When the PC 10 is powered on, the OS is booted and ODD 117 is powered on. When the OS is booted, the execution of the fault symptom utility program 204, which is composed of a resident program, is started. For example, at this time point, the fault symptom utility program 204 checks the past motor information which is accumulated in the nonvolatile storage device, and can determine the presence/absence of a fault symptom of the ODD 117.

During the time period in which the ODD 117 is powered on, when an access command from the host has been received, the controller 402 executes a process of rotating optical disc media by driving the spindle motor 303, and a process of moving the optical pickup head 304 by driving the thread motor 403. During the time period in which the ODD 117 is powered on, the measuring module 411 monitors, for example, the operation of the ODD motor (spindle motor 303, thread motor 403). The measuring module 411 measures the operation amount or operation performance of the ODD motor during the time period in which the ODD 117 is powered on (e.g. the total number of times with respect to a certain motor operation, the total time with respect to a certain motor operation, and the average time with respect to a certain motor operation). The measuring module 411 increments, in real time, the above-described total number of times and total time, in accordance with the operation of the motor during the time period in which the ODD 117 is powered on. In addition, the measuring module 411 executes a process of updating, in real time, the above-described average time, in accordance with the operation of the motor during the time period in which the ODD 117 is powered on. In the description below, the process of incrementing the total number of times and total time and the process of updating the average time are referred to as "accumulation process".

If there occurs an event such as an OS shut-down request, the fault symptom utility program 204 sends the drive-information sending command to the ODD 117, thereby acquiring the motor information (the measurement values corresponding to various test items) in the current power cycle from the ODD 117, and storing the acquired motor information in the nonvolatile storage device.

Figure 5:
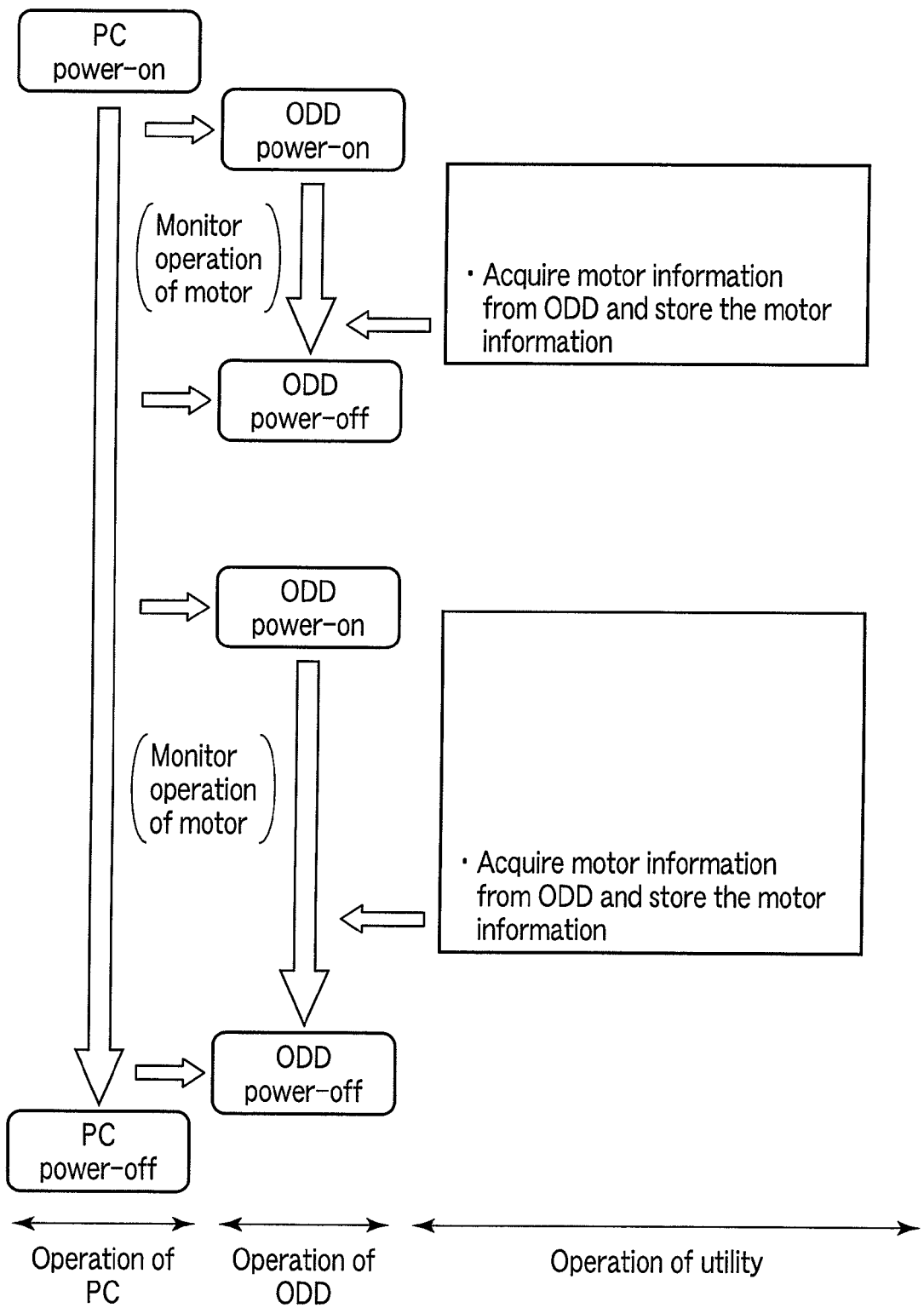
FIG. 5 is an exemplary view for explaining another example of the fault symptom determination process which is executed by the information processing apparatus according to the embodiment.

In the meantime, in the case where the PC 10 has a power-saving function of the ODD 117, it is possible that the ODD 117 alone is powered off in the state in which the PC 10 is powered on. If the ODD 117 is powered off, the values that are measured by the measuring module 411 are lost. Thus, as shown in FIG. 5, the fault symptom utility program 204 executes a process of acquiring the motor information (the measurement values corresponding to various test items) in the current power cycle from the ODD 117 and storing the acquired motor information in the nonvolatile storage device, each time an event of requesting power-off of the ODD 117 has occurred, even in the state in which the PC 10 is powered on. In this sense, the event of requesting power-off of the ODD 117 may include an event of requesting power-off of the PC 10 (e.g. OS shut-down request event), and an event of requesting power-off of only the ODD 117 for the purpose of power saving of the ODD 117.

Next, referring to FIG. 6, a description is given of the function of the fault symptom determination process of the present embodiment, in comparison with the S.M.A.R.T. function.

In the S.M.A.R.T. function of the HDD, the S.M.A.R.T. information (a value corresponding to a test item) is an accumulated value from the shipment of the HDD. On the other hand, in the present embodiment, the motor information (a value corresponding to a test item) is an accumulated value in every power cycle of the ODD 117. Specifically, in the ODD 117, the accumulated value in only 1 power cycle is calculated by the measuring module 411.

In the S.M.A.R.T. function of the HDD, the S.M.A.R.T. information is stored in disk media in the HDD. On the other hand, in the present embodiment, the motor information is stored in the nonvolatile storage device in the PC 10. The fault symptom utility program 204 acquires from the ODD 117 the motor information in the current power cycle by using the drive-information sending command, immediately before power-off of the ODD 117, and stores the acquired motor information in the nonvolatile storage device in the PC 10. The fault symptom utility program 204 totalizes the motor information corresponding to each of the plural power cycles, which is stored in the nonvolatile storage device in the PC 10, and predicts a fault of the ODD 117 on the basis of the totalization result.

Next, examples of motor information are described with reference to FIGS. 7.

The measuring module 411 can measure the total seek count of the thread motor 403 during a 1 power cycle period, the total seek distance of the thread motor 403 during a 1 power cycle period, the 12 cm media determination time during a 1 power cycle period, and the average seek time of the thread motor 403 during a 1 power cycle period.

The total seek count is indicative of the total number of times of execution of a seek operation for moving the optical pickup head 304 in the radial direction of the optical disk media by the thread motor 403. The total seek distance is indicative of a total distance of movement of the optical pickup head 304 by the seek operation. The average seek time is indicative of an average needed time which is needed for a seek operation from a predetermined track position to another predetermined track position. If the total seek count exceeds a predetermined number, or if the total seek distance exceeds a predetermined distance, it is possible that the performance of the thread motor 403 may begin to sharply lower. Thus, the total seek count and the total seek distance are useful as measurement values for evaluating the reliability of the thread motor 403.

The 12 cm media determination time is a time which is needed for a media determination process for determining that an optical disc medium with a diameter of 12 cm is loaded in the ODD 117. Specifically, the 12 cm media determination time is a time that is needed until the number of rotations of the spindle motor 303 increases from a first rotation number to a second rotation number when a 12 cm medium is loaded in the ODD 117.

The media determination process is a process of detecting a time that is needed until the rotation number (rotation speed) of the spindle motor 303 increases from the first rotation number to the second rotation number, thereby determining one of a state (state 1) in which no optical disc medium is loaded in the ODD 117, a state (state 2) in which an optical disc medium with a diameter of 8 cm is loaded in the ODD 117, and a state (state 3) in which an optical disc medium with a diameter of 12 cm is loaded in the ODD 117, based on the detected time. Optical disc media with a diameter of 12 cm are heavier than optical disc media with a diameter of 8 cm. Accordingly, the time needed in the state 3 is the longest, the time needed in the state 2 is shorter than the time needed in the state 3, and the time needed in the state 1 is shorter than the time needed in the state 2. Time zones 1, 2 and 3 corresponding to the state 1, state 2 and state 3 are preset. The controller 402 of the ODD 117 can determine which of the state 1, state 2 and state 3 is the current state of the ODD 117, according to which of the time zones 1, 2 and 3 corresponds to the time that is needed until the number of rotations of the spindle motor 303 increases from the first rotation number to the second rotation number. The media determination process is executed by the controller 402, for example, when the tray 301 is closed or when the ODD 117 is powered on.

The optical disc medium with a diameter of 12 cm is relatively heavy. Thus, in the case where the optical disc medium with a diameter of 12 cm is loaded, the time that is needed until the rotation number of the spindle motor 303 increases from the first rotation number to the second rotation number varies relatively greatly in accordance with the degradation in torque performance of the spindle motor 303. Therefore, the 12 cm media determination time is useful as a value for evaluating the reliability of the ODD 117.

In the present embodiment, the 12 cm media determination time is measured as a test item for evaluating the torque performance of the spindle motor 303. When the needed time with a value belonging to the time zone 3 is detected, the value of the detected needed time is the 12 cm media determination time.

For example, the measuring module 411 measures, as the 12 cm media determination time, the average value of the needed times which are needed until the rotation number of the spindle motor 303 increases from the first rotation number to the second rotation number in the state in which the 12 cm medium is loaded, and which are measured by one or more media determination processes that are executed by the ODD 117 during a 1 power cycle period.

The total seek count and the total seek distance are test items for evaluating the operation amount of the thread motor 403. The average seek time is a test item for evaluating the operation performance (the degree of degradation in performance) of the thread motor 403. The 12 cm media determination time is a test item for evaluating the operation performance (the degree of degradation in performance) of the spindle motor 303. Instead of the 12 cm media determination time, use may be made of the 8 cm media determination time which is indicative of the time that is needed until the rotation number of the spindle motor 303 increases from the first rotation number to the second rotation number in the state in which the 8 cm medium is loaded.

Further, the measuring module 411 can measure the total operation time of the spindle motor 303 in the 1 power cycle period, and the total number of times of turn-on of the spindle motor 303 in the 1 power cycle period.

The total operation time of the spindle motor 303 is a total value of time in which the spindle motor 303 is operated in the 1 power cycle period. Even when the ODD 117 is powered on, the spindle motor 303 is hardly rotated in the state in which no optical disc medium is loaded in the odd 117. Thus, in the ODD 117, it is possible that the total power-on time of the ODD 117 greatly differs from the total operation time of the spindle motor 303. Thus, the total operation time of the spindle motor 303 is useful as a value for evaluating the reliability of the ODD 117.

The media determination process is automatically executed by the ODD 117, and the host has no relation to the media determination process. In addition, there is a case in which the controller 402 rotates the ODD motor, for example, in the initializing process of the ODD 117. In the present embodiment, since the measuring module 411 is included in the ODD 117, the value corresponding to a predetermined test item of the ODD motor in the power-on cycle of the ODD 117 can precisely be measured.

Figure 8:
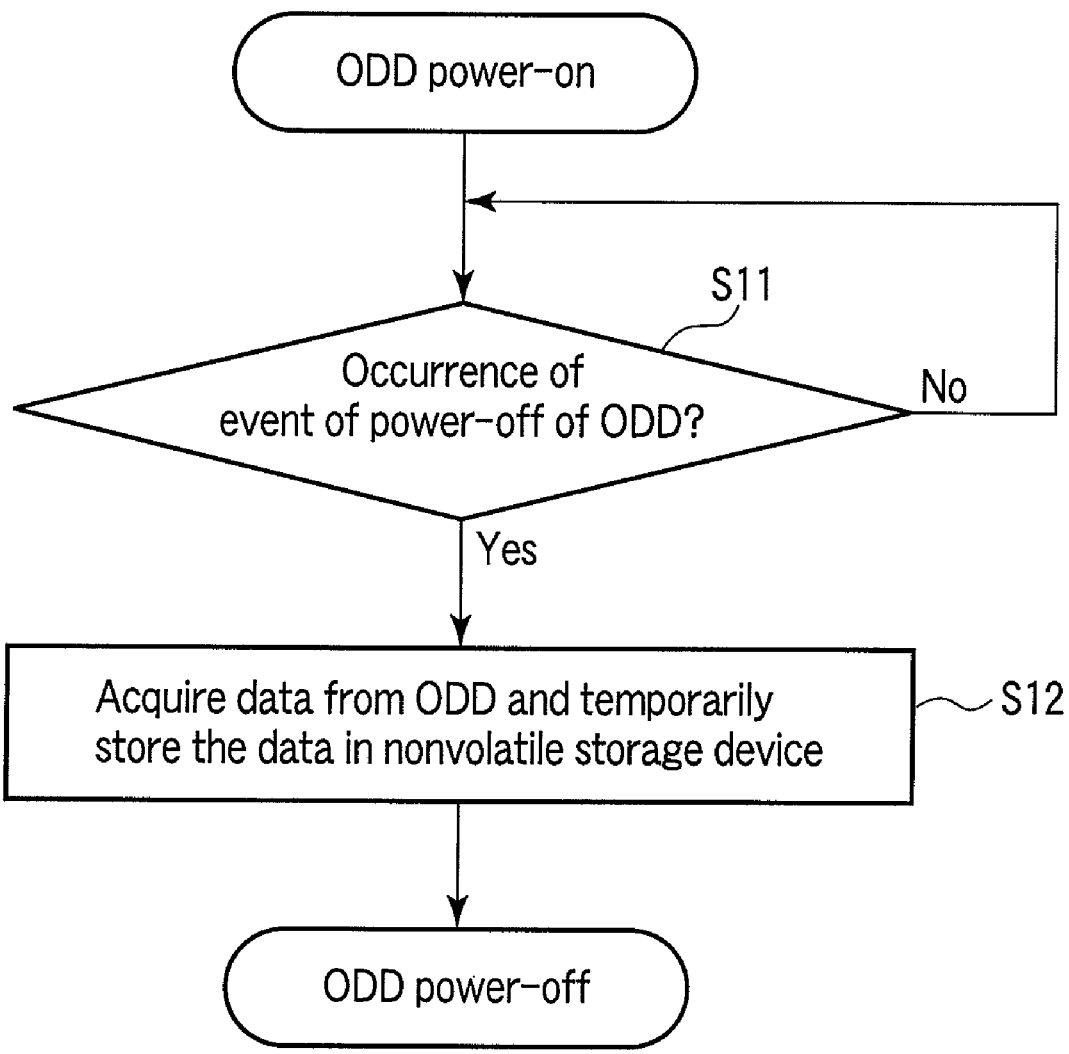
FIG. 8 is an exemplary flow chart illustrating an example of the procedure of a data acquisition process which is executed by the information processing apparatus according to the embodiment.

Next, referring to a flow chart of FIG. 8, a description is given of a motor information acquisition process which is executed by the fault symptom utility program 204.

After the ODD 117 is powered on, the fault symptom utility program 204 determines whether there has occurred an event of requesting power-off of the ODD 117 (step S11). For example, by communication with a utility program for executing power saving of the ODD 117, the fault symptom utility program 204 can detect that there has occurred an event of requesting power-off of the ODD 117. In step S11, an OS shut-down process is also detected by the fault symptom utility program 204 as an event of requesting power-off of the ODD 117.

When an event of requesting power-off of the ODD 117 has occurred, the fault symptom utility program 204 sends the drive-information sending command to the ODD 117, thereby to acquire data of motor information (step S12). The measuring module 411 of the ODD 117 returns, as a response to the drive-information sending command, current values corresponding to the various test items to the main body 11. The fault symptom utility program 204 stores the data of motor information from the ODD 117 (the current values corresponding to the various test items) in the nonvolatile storage device (step S12). After the data of motor information is stored, the ODD 117 is powered off.

Figure 9:
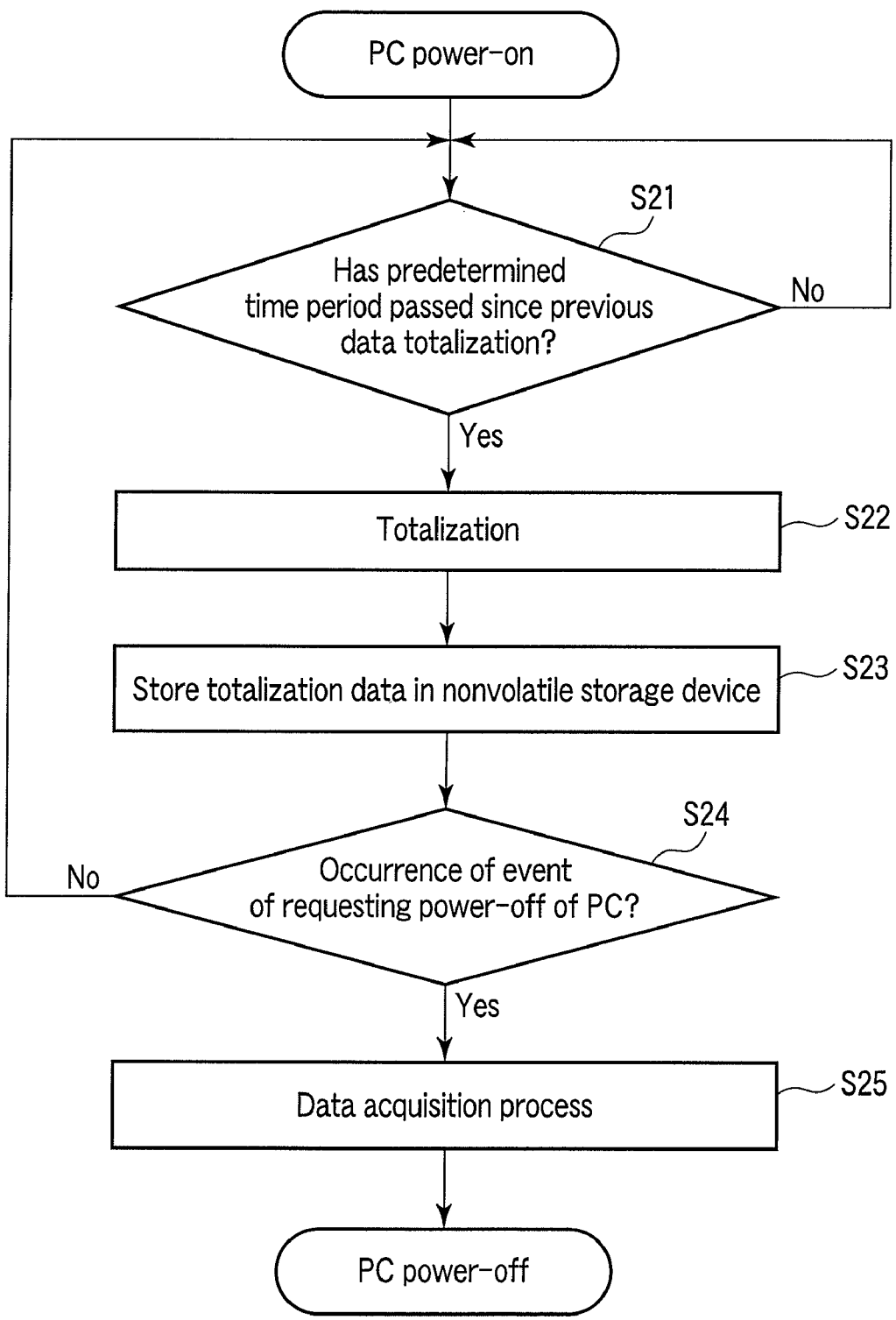
FIG. 9 is an exemplary flow chart illustrating an example of the procedure of a data totalization process which is executed by the information processing apparatus according to the embodiment.

Next, referring to a flow chart of FIG. 9, a description is given of an example of the process of totalizing the motor information corresponding to plural power cycles with respect to each of test items.

The fault symptom utility program 204 executes periodically, for example, once in a day, the process of totalizing the motor information data which is accumulated in the nonvolatile storage device.

If the PC 10 is powered on, the fault symptom utility program 204 is executed by the CPU 111. The fault symptom utility program 204 determines whether a predetermined time period has passed since the time of previous data totalization, for example, whether the date has changed since the day of previous data totalization (step S21). If the predetermined time period has passed since the time of previous data totalization (in the case where the date has changed since the day of previous data totalization), the fault symptom utility program 204 reads out the motor information that is accumulated in the nonvolatile storage device, and totalizes the values of motor information with respect to each of test items (step S22). In step S22, an accumulation process is executed with respect to each of test items, and thereby the motor information (log data) for one day is generated from the motor information corresponding to plural power cycles. Then, the fault symptom utility program 204 stores the generated log data in a log area of the nonvolatile storage device (step S23).

FIG. 10 shows an example of the data structure of the log data. The fault symptom utility program 204 adds the present date to the header part of the log data. In addition, the fault symptom utility program 204 records the accumulated value corresponding to each of plural test items ID in the data part of the log data.

If there occurs an event of requesting power-off of the PC 10 (step S24), the fault symptom utility program 204 executes the motor information acquisition process which has been described with reference to FIG. 8 (step S25). After the motor information acquisition process is executed, the PC 10 is powered off.

Next, referring to a flow chart of FIG. 11, a description is given of the procedure of the process of determining the presence/absence of a fault symptom.

The process of determining the presence/absence of a fault symptom is executed, for example, once in a week. The process of determining the presence/absence of a fault symptom is also executed when the execution of this process is instructed by the user.

To start with, the fault symptom utility program 204 determines whether there has come the timing of determining the presence/absence of a fault symptom of the ODD 117 (step S31). In the case where there has come the timing of determining the presence/absence of a fault symptom of the ODD 117, the fault symptom utility program 204 analyzes the log data (totalization data) stored in the nonvolatile storage device (step S32). In step S32, the process of accumulating the values of motor information is executed with respect to each of the test items. Thereby, the current value of each test item is calculated. For example, as regards the total seek count of the thread motor, the sum of the numbers of times of seek of the thread motor, which are described in all log data stored in the nonvolatile storage device, is calculated as the current value. In addition, for example, as regards the average seek time of the thread motor, the average value of the all average seek times which are described in all log data stored in the nonvolatile storage device, is calculated as the current value. The fault symptom utility program 204 compares the accumulated value (current value) with a threshold value with respect to each of the test items, and determines whether there is a test item having an accumulated value which exceeds the corresponding threshold value (step S33). If a test item having an accumulated value, which exceeds the corresponding threshold value, is detected, the fault symptom utility program 204 displays, on the display screen, a message indicating the presence of a fault symptom of the ODD 117, and informs the user of the detection of a fault symptom (step S34).

Figure 12:
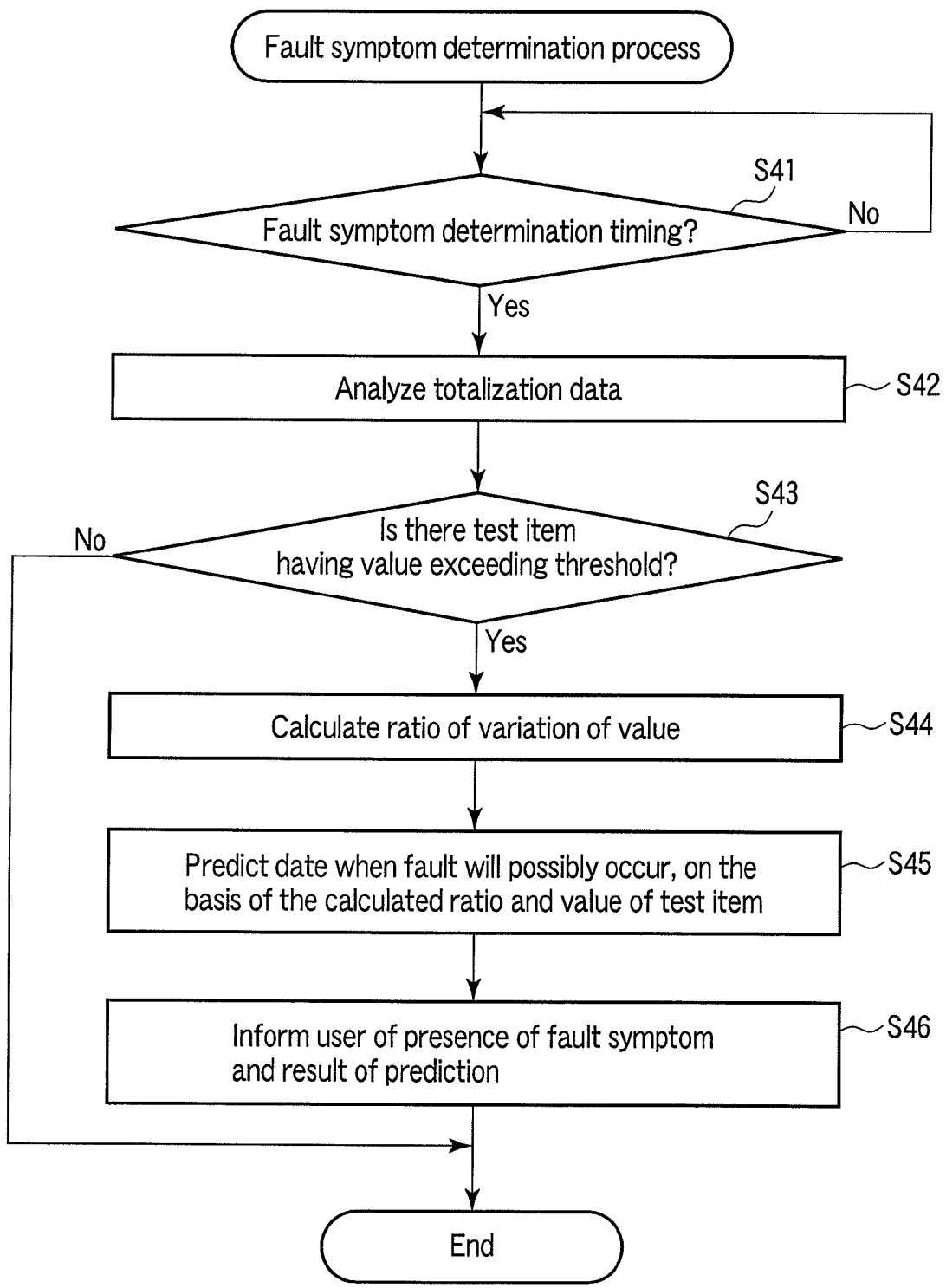
FIG. 12 is an exemplary flow chart illustrating another example of the procedure of the determination process which is executed by the information processing apparatus according to the embodiment.

Next, referring to a flow chart of FIG. 12, a description is given of another example of the procedure of the process of determining the presence/absence of a fault symptom.

To start with, the fault symptom utility program 204 determines whether there has come the timing of determining the presence/absence of a fault symptom of the ODD 117 (step S41). In the case where there has come the timing of determining the presence/absence of a fault symptom of the ODD 117, the fault symptom utility program 204 analyzes the log data (totalization data) stored in the nonvolatile storage device (step S42). In step S42, the process of accumulating the values of motor information is executed with respect to each of the test items. Thereby, the current value of each test item is calculated. The fault symptom utility program 204 compares the accumulated value (current value) with a first threshold value with respect to each of the test items, and determines whether there is a test item having an accumulated value which exceeds the corresponding first threshold value (step S43). The first threshold value is a value for determining whether degradation of the motor has begun, and the first threshold value is set for each of the test items.

If the test item having the accumulated value which exceeds the corresponding first threshold value is detected, the fault symptom utility program 204 analyzes, once again, all log data stored in the nonvolatile storage device, or log data for recent several days or several tens of days stored in the nonvolatile storage device, and calculates a ratio of variation which indicates at what ratio the value corresponding to the detected test item has increased day by day (step S44).

On the basis of the value corresponding to the detected test item, which is described in the log data of the latest date, and the calculated ratio of variation, the fault symptom utility program 204 predicts a date (day/time) when the value corresponding to the detected test item will possibly reach a second threshold value, that is, a date (day/time) at which a fault will possibly occur (step S45). The fault symptom utility program 204 displays, on the display screen, a message indicating the presence of a fault symptom of the ODD 117 and a predicted date of the occurrence of a fault, thus informing the user that a fault symptom has been detected (step S46).

As has been described above, in the present embodiment, the measuring module 411 for measuring the values relating to the operation of the ODD motor during a 1 power cycle period is provided within the ODD 117, and the fault symptom utility program 204 acquires from the ODD 117 the measurement values (motor information) when an event of requesting power-off of the ODD 117 has occurred, and stores the measurement value (motor information) in the storage device in the PC 10. Therefore, without providing a storage medium, which can permanently store data, in the optical disc drive, the motor information, which can be used for predicting a fault of the optical disc drive, can be obtained.

The process of determining the presence/absence of a fault symptom may not necessarily be executed within the PC 10. For example, motor information (measurement values or log data) may be sent to a predetermined server over a network, and this server may determine the presence/absence of a fault symptom of the ODD in the PC 10.

In the present embodiment, the presence/absence of a fault symptom is determined on the basis of a totalization result of motor information (measurement values) that is stored in the nonvolatile storage device. Alternatively, the presence/absence of a fault symptom may be determined on the basis of only the motor information (measurement value) which corresponds to a single power cycle.

All the procedures of the motor information acquisition process, totalization process and fault symptom determination process in the present embodiment may be executed by software. Thus, the same advantageous effects as in the present embodiment can easily be realized simply by installing a program, which executes these procedures, in an ordinary computer via a computer readable storage medium, and executing this program.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   an optical disc drive;
   a storage device;
   a measuring module in the optical disc drive, and configured to measure a value related to an operation of a predetermined motor in the optical disc drive during a time period of power-up of the optical disc drive;
   a measurement value reception module configured to receive a measurement value related to the operation of the predetermined motor from the optical disc drive in response to an event of being requested to turn off the power of the optical disc drive, and to store the received measurement value in the storage device, the received measurement value indicating the operation of the predetermined motor during one power cycle from power-on of the optical disc drive to power-off of the optical disc drive;
   a totaling module configured to perform a totalization process of totaling a plurality of measurement values stored in the storage device, the plurality of measurement values corresponding to a plurality of power cycles of the optical disc drive; and
   a determination module configured to determine a symptom of a fault of the optical disc drive based on a result of totalization,
   wherein the totaling module is further configured to determine in response to power-on of the information processing apparatus, whether a predetermined time period is passed since a time of previous totalization process, and perform the totalization process if the predetermined time period is passed since the time of the previous totalization process.

2. The information processing apparatus of claim 1, wherein the measurement value is indicative of a time to increase a number of rotations of a spindle motor in the optical disc drive from a first rotation number to a second rotation number when an optical disc medium with a predetermined diameter is loaded.

3. The information processing apparatus of claim 1, wherein the measurement value is indicative of at least one of a total number of times of seek operations for moving an optical pickup head by a thread motor in the optical disc drive, a total distance of movement of the optical pickup head by the seek operations, and an average time for the seek operations from a first predetermined track position to a second predetermined track position.

4. The information processing apparatus of claim 1, wherein the measurement value is indicative of a total time of operations by a spindle motor in the optical disc drive.

5. The information processing apparatus of claim 1, wherein the measurement value reception module is configured to acquire from the optical disc drive the measurement value related to the operation of the predetermined motor each time the event of being requested to turn off occurs, and to store the received measurement value in the storage device.

6. The information processing apparatus of claim 1, wherein the determination module is configured to display a message indicative of a presence of the fault symptom of the optical disc drive.

7. The information processing apparatus of claim 1,
   wherein the totaling module is configured to generate log data item by the totalization process, the log data item indicating the result of totalization, the log data item comprising an identifier (ID) indicative of a present date; and
   wherein the determination module is configured to calculate ratio of variation of the measurement values by analyzing a plurality of log data items comprising the IDs, and determine the symptom of the fault of the optical disc drive based on the calculated ratio.

8. A fault symptom determination method of determining a symptom of a fault of an optical disc drive in an information processing apparatus, the method comprising:
   measuring a value related to an operation of a predetermined motor in the optical disc drive during a time period of power-up of the optical disc drive;
   receiving a measurement value related to the operation of the predetermined motor from the optical disc drive in response to an event of being requested to turn off the power of the optical disc drive, the received measurement value indicating the operation of the predetermined motor during one power cycle from power-on of the optical disc drive to power-off of the optical disc drive;
   storing the received measurement value in a storage device in the information processing apparatus;
   determining, in response to power-on of the information processing apparatus, whether a predetermined time period is passed since a time of previous totalization process;
   performing a totalization process of totalizing a plurality of measurement values stored in the storage device if the predetermined time period is passed since the time of the previous totalization process, the plurality of measurement values corresponding to a plurality of power cycles of the optical disc drive; and
   determining the symptom of the fault of the optical disc drive based on a result of totalization.

9. The fault symptom determination method of claim 8, wherein the measurement value is indicative of a time to increase a number of rotations of a spindle motor in the optical disc drive from a first rotation number to a second rotation number when an optical disc medium with a predetermined diameter is loaded.

10. The fault symptom determination method of claim 8, wherein the measurement value is indicative of at least one of a total number of times of seek operations for moving an optical pickup head by a thread motor in the optical disc drive, a total distance of movement of the optical pickup head by the seek operations, and an average time for the seek operation from a first predetermined track position to a second predetermined track position.

11. The fault symptom determination method of claim 8, wherein the determining comprises displaying a message indicative of a presence of the fault symptom of the optical disc drive.

12. The fault symptom determination method of claim 8, wherein the performing the totalization process comprises generating log data item by the totalization process, the log data item indicating the result of totalization, the log data item comprising an identifier (ID) indicative of a present date; and wherein the determining comprises calculating ratio of variation of the measurement values by analyzing a plurality of log data items comprising the IDs, and determining the symptom of the fault of the optical disc drive based on the calculated ratio.

* * * * *